INVENTOR.
Henry R. Jacobs
BY
Wallenstein & Spangenberg
ATTYS.

United States Patent Office 3,113,076
Patented Dec. 3, 1963

3,113,076
MEDICINAL TABLETS
Henry R. Jacobs, 823 Ridge Terrace, Evanston, Ill.
Filed July 3, 1956, Ser. No. 595,658
9 Claims. (Cl. 167—82)

My invention relates to medicament products in solid, generally tablet, form so designed, however, that, when swallowed or taken internally, the active medicament therein is released in the body of a living animal, particularly a human being, at a relatively steady rate over an appreciable time interval, for instance, over a period of one or several hours or even a day or more so that a tablet need be taken only at relatively lengthy intervals, say once during several hours or only once a day.

Various efforts have been made in the past to achieve the aforementioned results. Thus, for instance, it has been suggested generally, in seeking to accomplish this result (see U.S. Patent No. 2,738,303), in the case of sympathomimetic agents, to provide a capsule containing a number of pellets of the selected sympathomimetic agent or agents, which pellets are provided with ingestible coatings of varying thicknesses whereby the release of the sympathomimetic agents is gradually achieved over a period of about ten to twelve hours. This approach to the problem, while reasonably effective, is relatively cumbersome and limited in the scope of its utility with respect to the dosing of medicaments generally of the type which it is desired should be released steadily over an appreciable period of time. Other approaches to the solution of the problem have not been adequately effective.

In accordance with my invention, a medicament product is provided in a solid or tablet form, of a size suitable for oral administration, so that when taken internally the active medicament is controllably released therefrom into the body of a living animal, particularly human, over an appreciable time interval and at a rate approaching a constant rate materially more closely than is obtained through the use of conventional tablets. In the accomplishment of this highly desirable result, the medicament is embodied or incorporated into a tablet of material to form a substantially uniform mixture which includes a pharmaceutically acceptable vehicle and the desired active medicament. The said tablet is provided with at least one aperture therein having a predetermined total inner surface area so related to the total outer surface area of said tablet that, during disintegration of said tablet in the body of a living animal, the total area of said tablet subject to disintegration and release of active medicament remains relatively constant, whereby said active medicament is released at a materially more constant rate over said appreciable time interval than would be achieved by a conventional solid tablet devoid of said specifically dimensioned aperture or apertures. This is accomplished by virtue of the fact that, as the tablet disintegrates, the area of the inner surfaces increases, thereby compensating for the generally corresponding decrease in the area of the outer surfaces. Thus, the total area of the inner and outer surfaces of the tablet, as indicated, remains relatively constant during disintegration of the tablet and release of medicament is effected at a generally constant rate. My invention makes possible effective control of the constancy of the rate of release of the medicament over a period of time as well as the magnitude of the rate of release of said medicament.

The vehicle utilized should be one which is characterized by fairly slow dissolution in the intestine. Such vehicles are, per se, well known in the art and are disclosed in numerous literature references including, for instance, the 25th edition of the U.S. Dispensatory. Typical examples of such vehicles, which are useful in the practice of my present invention, are salol (phenyl salicylate), keratin, gelatin-formaldehyde, cellulose phthalate. shellac, and stearic acid.

The medicaments used in the practice of my present invention, for incorporation into the novel medicament tablets, are especially advantageously of that type which are absorbed rapidly once they are freed from the tablet surface. Generally speaking, these medicaments (which term also encompasses therapeutic and chemotherapeutic agents for internal use), in the particularly preferred embodiments of my invention, should be those which have a recognized rapid but fairly transient effect. Typical examples of medicaments or drugs the utilization of which, in the practice of my present invention, is particularly desirable are belladonna alkaloids, sedative drugs, homatropine methyl bromide, and sympathomimetic drugs such as racemic amphetamine, dextro-amphetamine and their pharmaceutically acceptable salts (for convenience referred to in the claims simply as racemic amphetamine and dextro-amphetamine), salts of racemic desoxyephedrine, salts of dextro-desoxyephedrine, and compatible mixtures of the desired drugs. Sulfa drugs, such as the sulfonamides, sulfathiazole, sulfamethazine, sulfadiazine, sulfamerazine, and others of like character; and antibiotic agents such as bacitracin, streptomycin, aureomycin, penicillin, and the like, can also constitute medicaments which can be embodied in the medicament products of my invention.

The exact dimensions and configuration of the medicament products of my invention are subject, within limits, to substantial variation provided, however, that they embody the structural features and relationships which I have described above. The tablets must be of a size such that they can conveniently be swallowed whole, and they should be ample in size to contain the required or desired dosage of medicament or medicaments.

In the case of a simple cylinder, for instance, having a single aperture or channel therethrough circular in cross-section, it is clear that the area of the inner surface can never equal the area of the outer surface, no matter how thin the shell or remaining material becomes as dissolution proceeds. The area of the inner surface, at the outset, however, can be made such as not to be more than 25% less than the area of the outer surface so that, in its broader aspects, at least some advantages of my present invention can be obtained. By employing a plurality of apertures or channels, it is clear that an inner surface area can be obtained which is equal or essentially equal to the outer surface area so that, during disintegration or dissolution of the tablet in the intestines, for instance, the total area subjected to disintegration or dissolution remains essentially constant up to the moment when substantially the entire disintegration or dissolution of the tablet has occurred.

It will be apparent, of course, that the number of apertures in the tablet can be such in number that the diameter of said apertures is so small that the circulation of liquid therethrough, and hence the dissolution of the medication, will tend to be diminished. It is an important and highly desired feature of the tablets of the present invention, if the full advantages thereof are to be realized, that the aperture or apertures therein be of such size as to permit free circulation of digestive fluids or other liquids in the alimentary tract so as to provide for free circulation and steady disintegration of the tablet. Accordingly, from a practical standpoint, it will usually be found that, with a tablet of average size for convenient swallowing, the number of apertures should normally not exceed perhaps 6. Such apertures, it will be understood, can be of various cross-sectional configurations as, for instance, circular, triangular, square, hexagonal, elliptical, or of irregular configuration.

The difference in total area of the inside and outside surfaces should, as previously indicated, not exceed 25%. The areas of said inner and outer surfaces, therefore, may be such, for instance, that the total outer surface area is greater by not more than 25% the total of the inner surface area or, depending upon the specific design and the number of apertures, the total inner surface area may exceed by not more than 25% that of the outer surface.

With respect to the proportion of the ingredients used in the manufacture of the tablets of my invention, conventional practices may be followed so far as tablets per se are concerned. For instance, the vehicle can be employed in relatively large amounts where it is desired to make larger size tablets with a consequent longer dissolution time or, alternatively, depending upon the particular dissolution time desired and the nature of the specific medicament employed, the tablets can be made smaller in size. In general, the size of the tablets is determinable by what the proposed time of action of the medicament is desired to be and the nature of the particular medicament selected.

The several figures of the drawings are illustrative of different embodiments of the invention.

Figure 1:
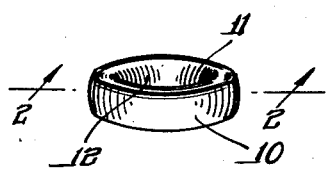
FIG. 1 is a perspective view of one form wherein there is a single cylindrical aperture the area of the inner surface walls of which is somewhat less than that of the outer generally cylindrical walls.

In the embodiment of FIG. 1, the tablet comprises a body generally in the shape of a flat cylinder with the outer wall 10 bowed slightly outwardly and with the inner surface 11 bowed slightly inwardly, the aperture 12 extending through said body. The diameters of the outer and inner walls comprising said surfaces 10 and 11 are so selected that the difference therebetween does not exceed 25% and the total area subject to disintegration and release of active medicament does not vary more than 25% from the original area.

Figure 2:
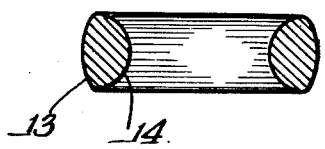
FIG. 2 is a central cross-sectional view of another form wherein the area of the inner surface walls is essentially equal to that of the outer surface walls.

In the embodiment of FIG. 2, the tablet likewise comprises a centrally apertured body. The outer surface 13 has only a slight outward bow or curvature whereas the inner surface 14 has a substantially greater bow or curvature. The surface areas of the outer and inner walls comprising the surfaces 13 and 14 are so dimensioned that they are substantially equal and, as the tablet disintegrates in the human body, the total area thereof subject to disintegration remains relatively constant.

Figure 3:
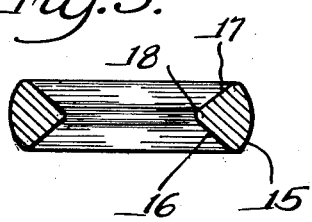
FIG. 3 is a central cross-sectional view of still another form wherein the area of the inner surface walls is essentially equal to that of the outer surface walls.

FIG. 3 shows an embodiment generally similar to that of FIG. 2. In the case of FIG. 3, however, while the configuration of the outer surface 15 is such as to provide a slight bow or curvature, that of the inner surface comprises converging portions 16 and 17 which meet at a central line 18. During disintegration of the tablet, the total surface area of the tablet remains relatively constant.

Figure 4:
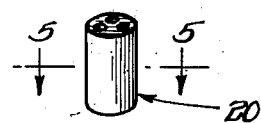
FIG. 4 is a perspective view of yet another embodiment in which a plurality of cylindrical apertures or channels is provided the sum of areas of the inner cylindrical walls thereof being substantially equal to the area of the outer cylindrical wall surface.
Figure 5:
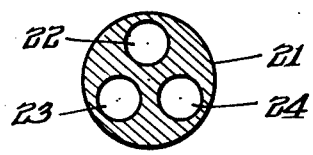
FIG. 5 is a horizontal sectional view taken along the line 5—5 of FIG. 4.

In FIGS. 4 and 5, the tablet comprises a small cylindrical body 20 having an outer peripheral surface 21 with three cylindrical apertures or channels 22, 23 and 24 extending therethrough. The sum of the areas of the surfaces of the walls defining said apertures or channels is made essentially equal to the area of the peripheral surface 21. To this end, for instance, the outside diameter of the cylindrical body 20 may be 3 mm. and the diameters of each of the apertures or channels 22, 23 and 24 is 1 mm. The length of the cylindrical body may conveniently be about 10 mm.

Figure 6:
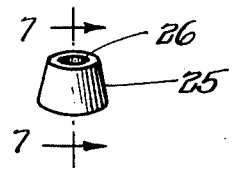
FIG. 6 is a perspective view of a still further embodiment of the invention.
Figure 7:
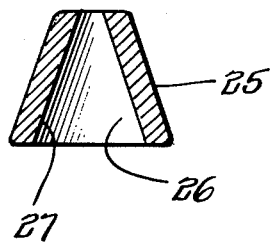
FIG. 7 is a vertical sectional view taken along the line 7—7 of FIG. 6.

The embodiment of FIGS. 6 and 7 comprises a frusto-conical body having an outer or peripheral wall 25 and an aperture or channel 26, generally conical in shape, defined by inner surface 27, said aperture or channel extending through said body. Here, again, the outer and inner surfaces 25 and 27 are so related that the total surface area subject to disintegration does not change appreciably during the period of disintegration of the tablet in the human or animal system, not varying by more than about 25% from the start to just prior to the finish of the disintegration of said tablet.

The following examples are illustrative of medicament compositions which can be made in the form or configuration of products conforming to the principles and teachings of my invention.

*Example 1*

|  | Mg. |
|---|---|
| Dextro-amphetamine sulfate | 10 |
| Cellulose phthalate | 50 |
| Excipients, colors, flavors (as desired) | Up to 1 |

*Example 2*

| Phenobarbital | 60 |
|---|---|
| Salol | 60 |
| Stearic acid | 60 |
| Excipients, colors, flavors (as desired) | Up to 1 |

*Example 3*

| Reserpine | 0.3 |
|---|---|
| N-butyl stearate | 30 |
| Carnauba wax | 30 |
| Stearic acid | 30 |
| Excipients, colors, flavors (as desired) | Up to 1 |

*Example 4*

| Homatropine methyl bromide | 10 |
|---|---|
| Shellac | 100 |
| Excipients, colors, flavors (as desired) | Up to 1 |

In the forming of the medicament compositions into the shapes or configurations contemplated in accordance with my invention, techniques such as pressing, molding, extruding and the like can be used, depending, for instance, on the nature of the particular incredients employed in any given composition. For instance, a mass of the composition in the relative proportions of Example 1 may be admixed with a sufficient quantity of acetone to render said mass plastic, the latter being extruded into the configuration desired pursuant to my present invention and cut into proper lengths or sections and the acetone removed by the application of heat. In the case of Examples 2 and 3, a mass of the compositions in the relative proportions specified is warmed, extruded into the desired configuration, cut into proper lengths or sections and cooled to effect solidification. In the case of Example 4, the same procedure may be followed as is described in connection with Example 1 except that ethyl alcohol is utilized in place of acetone. In other cases, dry pressing techniques can be used, the dry mixture being formed into the desired configuration in a pill machine suitably modified to bring about said desired configuration.

If desired, the tablets of my invention are subject to further modification as, for instance, by coating techniques. Thus, the outside surface of my tablets can be coated with an insoluble, or partially soluble, material in order to prevent or retard the release of medication from the outer surface, leaving all or much of the medication to be released from the inner surface or surfaces.

In this way, as the tablet disintegrates in the body of the human or animal, the release of medicament is at a constantly increasing rate. This represents a special effect which the tablets of my invention make possible of achievement.

What I claim as new and desire to protect by Letters Patent of the United States is:

1. A medicament product in solid tablet form, designed to be taken internally and controllably to release active medicament therefrom into the body of a living animal over an appreciable time interval, comprising a tablet containing a substantially uniform mixture including a pharmaceutically acceptable vehicle and an active medicament, said tablet having at least one aperture therein having a predetermined total inner surface area so related to the total outer surface area of said tablet that, during disintegration of said medicament product in the body of a living animal, the total area of said medicament product subject to disintegration and release of active medicament remains relatively constant, whereby said active medicament is released at a materially more constant rate over said appreciable time interval than would be achieved by a conventional solid tablet devoid of said aperture.

2. A medicament product in solid tablet form, designed to be taken internally and controllably to release active medicament therefrom into the body of a living animal at a relatively steady rate over an appreciable time interval, comprising a tablet containing a substantially uniform mixture including a pharmaceutically acceptable vehicle and an active medicament, said tablet having at least one aperture therein having a predetermined total inner surface area so related to the total outer surface area of said tablet that, during disintegration of said medicament product in the body of a living animal, the total area of said medicament product subject to disintegration and release of active medicament does not vary by more than 25% from the original area, up to essentially the time of total disintegration of said medicament product, whereby said active medicament is released at a desired relatively steady rate over said appreciable time interval.

3. A medicament product in solid tablet form, designed to be taken internally and to release active medicament therefrom into the body of a living animal at a relatively steady rate over an appreciable time interval, comprising a tablet containing a substantially uniform mixture including a pharmaceutically acceptable vehicle and an active medicament, said tablet having a plurality of channels passing therethrough having a predetermined total inner surface area so related to the total outer surface area of said tablet that, during disintegration of said medicament product in the body of a living animal, the total area of said medicament product subject to disintegration and release of active medicament remains substantially constant, whereby said active medicament is released at a relatively steady rate over said appreciable time interval.

4. A medicament product in solid generally tablet form, designed to be swallowed and to release active medicament therefrom into the body of a human being at a relatively steady rate over an appreciable time interval, comprising a tablet containing a substantially uniform mixture including a pharmaceutically acceptable vehicle and an active medicament, said tablet having at least one aperture therein having a predetermined total inner surface area so related to the total outer surface area of said tablet that, during disintegration of said medicament product in the body of a human being, the total area of said medicament product subject to disintegration and release of active medicament remains substantially constant, whereby said active medicament is released at a relatively steady rate over said appreciable time interval.

5. A medicament product in accordance with claim 1, wherein the aperture is sufficiently large to permit free circulation of digestive fluids therethrough.

6. A medicament product in solid tablet form, designed to be taken internally and controllably to release active medicament therefrom into the body of a living animal over an appreciable time interval, comprising a tablet containing a substantially uniform mixture including a pharmaceutically acceptable vehicle and an active medicament, said tablet having at least one aperture therein having a predetermined total inner surface area so related to the total outer surface area of said tablet that, during disintegration of said medicament product in the body of a living animal, the total area of said medicament product subject to disintegration and release of active medicament remains relatively constant, whereby said active medicament is released at a materially more constant rate over said appreciable time interval than would be achieved by a conventional solid tablet devoid of said aperture, said active medicament being one having a relatively rapid and transient effect and being selected from the group consisting of racemic amphetamine and dextro-amphetamine.

7. A medicament product in solid tablet form, designed to be taken internally and controllably to release medicament therefrom into the body of a living animal at a relatively steady rate over an appreciable time interval, comprising a tablet containing a substantially uniform mixture including a pharmaceutically acceptable vehicle and a belladonna alkaloid medicament, said tablet having at least one aperture therein having a predetermined total inner surface area so related to the total outer surface area of said tablet that, during disintegration of said medicament product in the body of a living animal, the total area of said medicament product subject to disintegration and release of said medicament does not vary by more than 25% from the original area, up to essentially the time of total disintegration of said medicament product, whereby said medicament is released at a desired relatively steady rate over said appreciable time interval.

8. A medicament product in solid tablet form, designed to be taken internally and to release a sedative drug medicament therefrom into the body of a living animal at a relatively steady rate over an appreciable time interval, comprising a tablet containing a substantially uniform mixture including a pharmaceutically acceptable vehicle and a sedative drug medicament, said tablet having at least one channel passing therethrough having a predetermined total inner surface area so related to the total outer surface area of said tablet that, during disintegration of said medicament product in the body of a living animal, the total area of said medicament product subject to disintegration and release of said medicament remains substantially constant, whereby said medicament is released at a relatively steady rate over said appreciable time interval.

9. A medicament product in solid generally tablet form, designed to be swallowed and to release active medicament therefrom into the body of a human being at a relatively steady rate over an appreciable time interval, comprising a tablet containing a substantially uniform mixture including a pharmaceutically acceptable vehicle and an active medicament, said tablet having at least one aperture therein having a predetermined total inner surface area so related to the total outer surface area of said tablet that, during disintegration of said medicament product in the body of a human being, the total area of said medicament product subject to disintegration and release of active medicament remains substantially constant, whereby said active medicament is released at a relatively steady rate over said appreciable time interval, said active medicament being one having a relatively rapid and transient effect and being selected from the group consisting of racemic amphetamine and dextro-amphetamine.

(References on following page)

References Cited in the file of this patent

UNITED STATES PATENTS

| | | |
|---|---|---|
| 76,176 | Edey | Mar. 31, 1868 |
| 216,107 | Richards | June 3, 1879 |
| 2,106,097 | Homan | Jan. 18, 1938 |
| 2,312,381 | Bickenheuser | Mar. 2, 1943 |
| 2,517,513 | Vaernet | Aug. 1, 1950 |
| 2,736,682 | Hermelin | Feb. 28, 1956 |
| 2,773,502 | Kaslow et al. | Dec. 11, 1956 |

FOREIGN PATENTS

| | | |
|---|---|---|
| 15,161 of 1902 | Great Britain | July 2, 1903 |
| 442,266 | France | June 17, 1912 |

OTHER REFERENCES

"Manufacture of Compressed Tablets," Silver et al., 1944, F. J. Stokes Machine Co., p. 2.

"Tablet Making," by Little et al., pub. by the Northern Pub. Co., Ltd., 1949, face plate opposite page 3.

Modern Drug Encyclopedia, 5th ed., Drug Publications, Inc., New York, 1952 (pages 116, 117, 280 and 281).